(12) United States Patent
Grey et al.

(10) Patent No.: US 6,507,842 B1
(45) Date of Patent: Jan. 14, 2003

(54) SYSTEM AND METHOD FOR IMPORTING AND EXPORTING TEST EXECUTIVE VALUES FROM OR TO A DATABASE

(75) Inventors: James Grey, Cedar Park, TX (US); Scott Richardson, Cedar Park, TX (US); Patrick Williams, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 289 days.

(21) Appl. No.: 09/613,341

(22) Filed: Jul. 10, 2000

(51) Int. Cl.[7] .............................................. G06F 17/30
(52) U.S. Cl. ................... 707/5; 707/3; 714/33
(58) Field of Search ................ 707/5, 3, 4, 1, 707/2, 102, 104; 714/33, 38; 717/128; 706/55; 324/158.1

(56) References Cited

U.S. PATENT DOCUMENTS

| | | | |
|---|---|---|---|
| 5,652,835 A | * 7/1997 | Miller | 706/55 |
| 5,737,512 A | 4/1998 | Proudfoot et al. | |
| 5,781,720 A | * 7/1998 | Parker et al. | 714/38 |
| 5,910,895 A | 6/1999 | Proskauer et al. | |
| 5,991,537 A | 11/1999 | McKeon et al. | |
| 6,002,868 A | 12/1999 | Jenkins et al. | |
| 6,047,293 A | 4/2000 | Blitz | |
| 6,249,882 B1 | * 6/2001 | Testardi | 714/38 |
| 6,353,904 B1 | * 3/2002 | Le | 324/158.1 |
| 6,397,378 B1 | * 5/2002 | Grey et al. | 717/128 |
| 6,401,220 B1 | * 6/2002 | Grey et al. | 714/33 |

OTHER PUBLICATIONS

National Instruments Corporation TestStand User Manual, Limit Loader, pp. 10–21 thru 10–28, dated Dec. 1998.

* cited by examiner

Primary Examiner—Sanjiv Shah
(74) Attorney, Agent, or Firm—Jeffrey C. Hood

(57) ABSTRACT

A system and method for importing and exporting test executive values from or to a database. A test executive may provide the user various places, referred to as variables and properties, in which data values can be stored. These data values may affect execution of a test executive sequence. Variables may be global to a sequence file or local to a particular sequence. Each step in a sequence can have properties. The user may include a Property Loader step in a sequence, which is operable to dynamically, i.e., at run time, load property and/or variable values from a database. The Property Loader step may be placed in a setup group of the sequence, and the step(s) whose properties are configured may be placed in a main group of the sequence, so that when the sequence is executed the steps in the main group are configured with appropriate property values before running. The test executive may also enable a user to interactively, e.g., through a user interface menu item, request variable and property values associated with a sequence to be imported from or exported to a database. For example, after exporting values to a database, the values may later be used to dynamically configure a test executive sequence.

37 Claims, 12 Drawing Sheets

| STEPNAME | LIMITS_HIGH | LIMITS_LOW | LIMITS_STRING | POWER_ON | COUNT | SEQUENCE NAME |
|---|---|---|---|---|---|---|
| Voltage at Pin A | 9 | 11 | — | — | — | Phone Test.seq |
| Voltage at Pin B | 8.5 | 9.5 | — | — | — | Phone Test.seq |
| Self Test Output | — | — | "SYS OK" | — | — | Phone Test.seq |
| <Locals> | — | — | — | — | 100 | Phone Test.seq |
| <File Globals> | — | — | — | — | 99 | Phone Test.seq |
| <Station Globals> | — | — | — | False | — | Phone Test.seq |
| Frequency at Pin A | 100,000 | 10,000 | — | — | — | Frequency Test.seq |
| Frequency at Pin B | 90,000 | 9,000 | — | — | — | Frequency Test.seq |
| Self Test Output | — | — | "OK" | — | — | Frequency Test.seq |

FIG 6

SYSTEM AND METHOD FOR IMPORTING AND EXPORTING TEST EXECUTIVE VALUES FROM OR TO A DATABASE

FIELD OF THE INVENTION

The present invention relates to test executive software for organizing and executing test sequences, e.g., to measure and/or control instrumentation systems, and more particularly relates to a system and method for importing/exporting test executive properties from/to a database.

DESCRIPTION OF THE RELATED ART

A test executive is a program that allows a user to organize and execute sequences of reusable test modules to automatically control a test, such as a test involving one or more instruments or devices or software applications. The test modules often have a standard interface and typically can be created in a variety of programming environments. The test executive software operates as the control center for the automated test system. More specifically, the test executive software allows the user to create, configure, and/or control test sequence execution for various test applications, such as production and manufacturing test applications. Text executive software typically includes various features, such as test sequencing based on pass/fail results, logging of test results, and report generation, among others.

Test executives include various general concepts. The following comprises a glossary of test executive nomenclature.

Code Module—A program module, such as a Windows Dynamic Link Library (.dll), Java class file, LabVIEW VI (.vi), etc., that contains one or more functions that perform a specific test or other action.

Test Module—A code module that performs a test.

Step—Any action, such as calling a test module to perform a specific test, that the user can include within a sequence of other actions.

Step Module—The code module that a step calls.

Sequence—A series of steps that the user specifies for execution in a particular order. Whether and when a step is executed can depend on the results of previous steps.

Subsequence—A sequence that another sequence calls. The user specifies a subsequence call as a step in the calling sequence.

Sequence File—A file that contains the definition of one or more sequences.

Sequence Editor—A program that provides a graphical user interface for creating, editing, and debugging sequences.

Run-time Operator Interface—A program that provides a graphical user interface for executing sequences on a production station. A sequence editor and run-time operator interface can be separate application programs or different aspects of the same program.

Test Executive Engine—A module or set of modules that provide an API for creating, editing, executing, and debugging sequences. A sequence editor or run-time execution operator interface uses the services of a test executive engine.

Application Development Environment (ADE)—A programming environment such as LabVIEW, LabWindows/CVI, or Microsoft Visual C++, in which the user can create test modules and run-time operator interfaces.

Unit Under Test (UUT)—A device or component that is being tested; may include software and/or hardware elements.

In many cases it is useful to provide users with the ability to define variables and properties which affect the execution behavior of a test executive sequence. For example, a particular step may be used in testing a group of different devices, but the step may need to use different limit values for each device. In this example, properties for the limit values may be defined for the step, and the property values may be changed as necessary for each device, without requiring any modifications to the code module that the step calls.

As test executive sequences grow larger and more complex and as the number of different units under test requiring different test behavior grows, configuring sequences and steps with correct variable and property values becomes a difficult task. Thus, it is desirable to provide a way to automatically configure test executive sequences and steps with appropriate variable and property values. In particular, it is desirable to enable the values to be stored in a database and automatically loaded as needed.

SUMMARY OF THE INVENTION

The problems outlined above may in large part be solved by providing a system and method for importing and exporting test executive values from or to a database. The test executive values that may be imported and/or exported include sequence variable values and step property values. As used herein, a sequence comprises a series of steps, wherein the steps may be executed to perform a test of a unit under test (UUT). A given step can do many things, such as initializing an instrument, performing a complex test, or making a decision that affects the flow of execution in a sequence. Steps can perform these actions through several types of mechanisms, including jumping to another step, executing an expression, calling a sub-sequence or calling an external code module, etc.

A test executive may provide the user various places, referred to as variables and properties, in which data values can be stored. These data values may affect execution of the test executive sequence. Variables are properties that the user can freely create in certain contexts. Variables may be global to a sequence file or local to a particular sequence. Each step in a sequence can have properties. For example, a step might have an integer error code property. In one embodiment, individual steps may be instances of "step types" which have associated properties.

Values that are stored in variables and properties can be passed to code modules. When executing sequences, the test executive may maintain a "sequence context" that contains references to global variables and local variables and step properties in active sequences. The contents of the sequence context change depending on the currently executing sequence and step.

According to one embodiment of the present invention, the user may include a Property Loader step in a sequence, which is operable to dynamically, i.e., at run time, load property and/or variable values from a database. For example, it may be desirable to automatically configure a particular step with two different property values affecting operation of the step, depending on which of two different devices are currently under test. The Property Loader step may be placed in a setup group of the sequence, and the step(s) whose properties are configured may be placed in a main group of the sequence, so that when the sequence is executed the steps in the main group are configured with appropriate property values before running.

After including the Property Loader step in a sequence at edit time, the user may configure the step to load the desired variable and/or property values from the database. In various embodiments, this configuration process may require specifying various types of information. For example, the user may specify a particular database from which to load the values. The user may also specify a mapping of properties/variables to database values. For example, specifying this mapping may comprise specifying a database table and a mapping of properties/variables to columns in the table. For other types of databases, e.g., object-oriented databases, this mapping may be specified in any of various other ways. Exemplary user interface dialog boxes for specifying the mapping are discussed. The user may also configure the Property Loader step with filtering information specifying criteria which the database values must satisfy in order to be loaded. If the filtering criteria are not specified, default values for the variables/properties may be used instead.

It is noted that in alternative embodiments, a test executive sequence may be configured to dynamically load property/variable values from a database using methods other than including a Property Loader step in the sequence. For example, the test executive sequence may maintain information regarding data values to be loaded as a portion of the sequence data, wherein this information may be specified by user interface dialogs that may be invoked via a menu item accessible while editing a test executive sequence. In other words, the data import information is not necessarily included in a sequence step but may be associated with the sequence in any of various ways, and when the sequence is executed, the test executive application may be operable to use the information to load the specified property/variable values from a database.

In addition to dynamically loading values at runtime, in various embodiments the test executive may also enable a user to interactively, e.g., through a user interface menu item, request variable and property values to be imported from or exported to a database. For example, after interactively setting desired variable and property values for a sequence and steps in the sequence, respectively, the user may request the test executive to automatically export the values to a database. The exported values may, for example, later be used to dynamically configure a test executive sequence, as described above. Exporting values to a database may comprise automatically creating any necessary database structures, such as tables, columns, etc.

BRIEF DESCRIPTION OF THE DRAWING

A better understanding of the present invention can be obtained when the following detailed description of the preferred embodiment is considered in conjunction with the following drawings, in which:

FIGS. 6–12 illustrate graphical user interface dialogs associated with a particular embodiment of a test executive application that supports dynamic runtime loading of property and variable values from a database and supports edit-time importing and exporting of property and variable values from/to a database.

Figure 1:
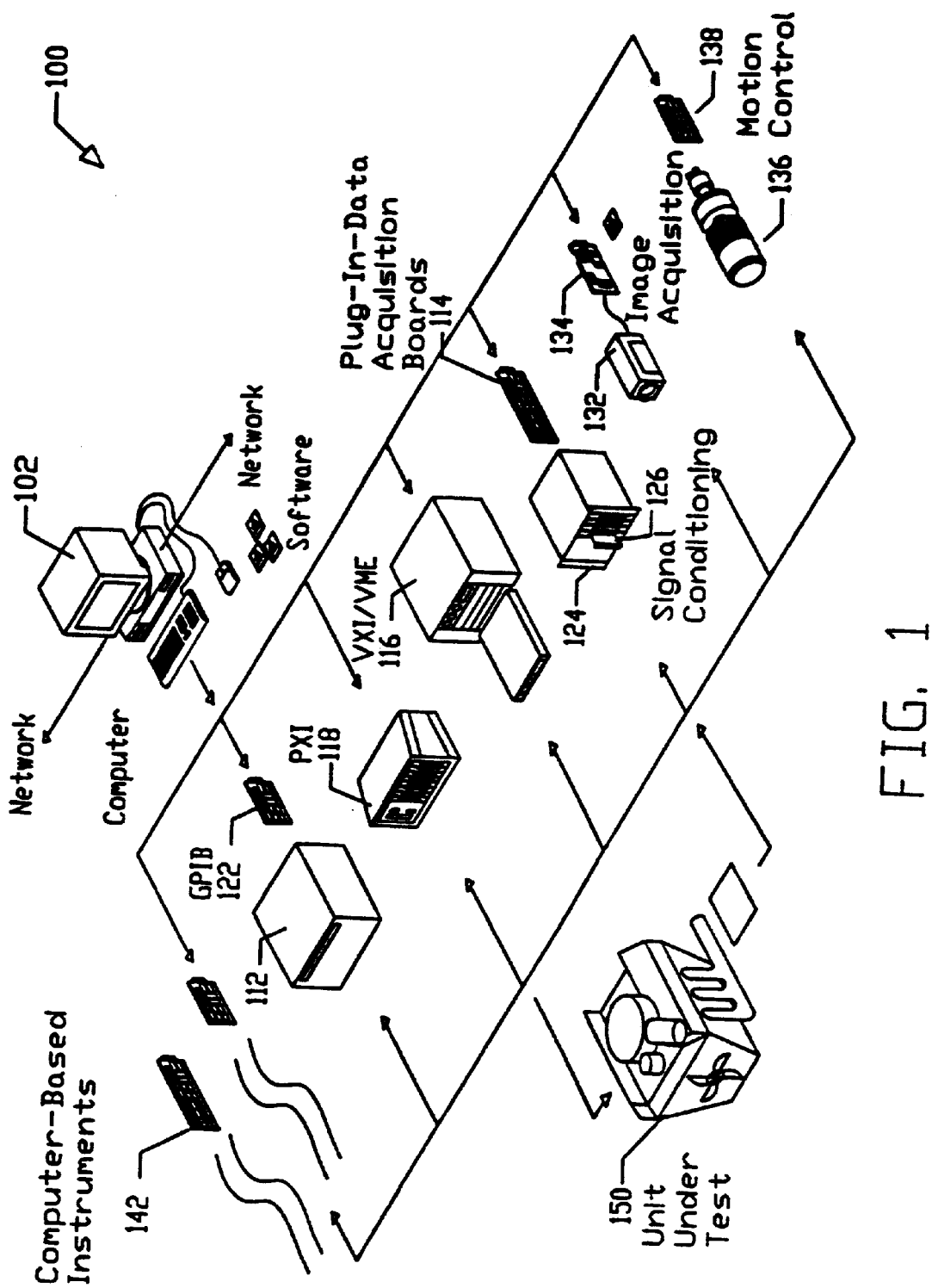
FIG. 1 illustrates an instrumentation control system according to one embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The TestStand product user documentation, available from National Instruments Corporation, is hereby incorporated by reference as though fully and completely set forth herein.

FIG. 1—Instrumentation System

FIG. 1 illustrates an example instrumentation control system 100. FIG. 1 is exemplary only, and the present invention may be used in any of various systems, as desired.

The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via a GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and optionally interfaces through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 is coupled to the computer 102 via a serial bus, MXI bus, or other serial or parallel bus provided by the computer 102. The computer 102 preferably includes VXI interface logic, such as a VXI, MM or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. Other types of instruments or devices may be connected to the system, as desired. The system 100 may be used in a data acquisition and control application, in a test and measurement application, a process control application, an industrial automation application, or a man-machine interface application, among others.

The computer system 102 preferably includes a memory medium on which computer programs according to the present invention are stored. The term "memory medium" is intended to include an installation media, e.g., a CD-ROM, or floppy disks 104, a computer system memory such as DRAM, SRAM, EDO RAM, etc., or a non-volatile memory such as a magnetic medium, e.g., a hard drive, or optical storage. The memory medium preferably stores test executive software for creating and/or controlling an automated test system. The host computer CPU executing code and data from the memory medium comprises a means for creating and executing test programs according to the methods described below. The test executive software allows the user to create, configure, and/or control test sequence execution for various test applications, such as production and manufacturing test applications.

As described below, the test executive software is operable to interact with a database in order to import and/or export property and/or variable values from/to a database. The TestStand test executive software, available from National Instruments, includes features such as described herein for interacting with databases to import and export test executive values. The database may be stored on the memory medium of the computer system 102 and may execute on the computer system 102, or the database may be located on another computer system, such as a computer system accessible to the computer system 102 via a network.

Test Executive Software Components

Figure 2:
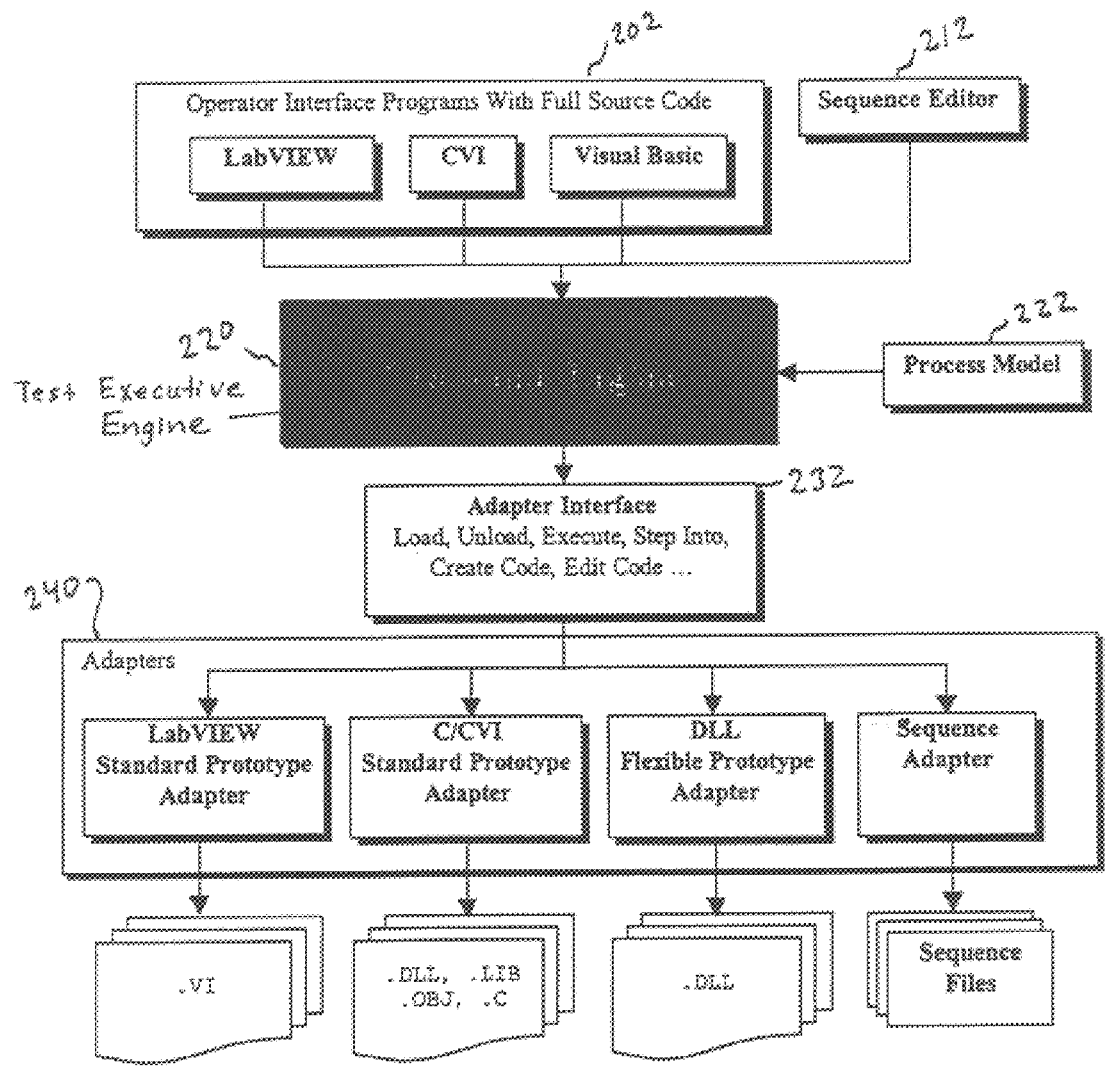
FIG. 2 illustrates a test executive application software architecture according to one embodiment of the present invention.

FIG. 2 is a block diagram illustrating high-level architectural relationships between elements of one embodiment of a test executive software application. In one embodiment, the elements of FIG. 2 are comprised in the TestStand test executive product from National Instruments. It is noted that FIG. 2 is exemplary, and the present invention may be applied to any of various test executive applications. As shown, the test executive software includes operator interface programs 202 for interfacing to various software programs. The operator interface programs 202 shown in FIG. 2 are for interfacing to the LabVIEW, LabWindows CVI, and Visual Basic programs. However, additional operator interface programs 202 may be included for interfacing to other programs.

The test executive software also includes a sequence editor 212 for editing sequences. The sequence editor 212 and the operator interface programs 202 interface to the test executive engine 220. One or more process models 222 couple to the test executive engine 220. The test executive engine 220 interfaces through an adapter interface 232 to one or more adapters 240. The adapters shown in FIG. 2 include the LabVIEW standard prototype adapter, the C/CVI prototype adapter, the DLL flexible prototype adapter, and the sequence adapter. The LabVIEW standard prototype adapter interfaces to programs having a .VI extension, i.e., LabVIEW graphical programs. The C/CVI prototype adapter interfaces to programs having a .dll, lib, .obj, or .c extension. The DLL flexible prototype adapter interfaces to programs having a .dll extension. The sequence adapter interfaces to sequence file programs.

As shown in FIG. 2, the test executive engine 220 plays a pivotal role in the test executive architecture. The test executive engine 220 runs sequences. Sequences contain steps that can call external code modules. By using module adapters 240 that have the standard adapter interface 232, the test executive engine 220 can load and execute different types of code modules. Test executive sequences can call sub-sequences through the common adapter interface 232. The test executive may use a special type of sequence called a process model to direct the high-level sequence flow. The test executive engine 220 exports an ActiveX Automation API used by the sequence editor 212 and run-time operator interfaces 202.

Test Executive Sequence Editor

The sequence editor 212 is an application program in which the user creates, modifies, and debugs sequences. The sequence editor 212 provides the user easy access to the test executive features, such as step types and process models. The sequence editor 212 includes debugging tools found in application development environments such as LabVIEW, LabWindows/CVI, and Microsoft Visual C/C++. These include breakpoints, single stepping, stepping into or over function calls, tracing, a variable display, and a watch window.

In the sequence editor 212, the user can start multiple concurrent executions. Multiple instances of the same sequence can be executed, and different sequences can be executed at the same time. Each execution instance has its own execution window. In trace mode, the execution window displays the steps in the currently executing sequence. When execution is suspended, the execution window displays the next step to execute and provides single-stepping options.

Test Executive Run-Time Operator Interfaces

In the example illustrated in FIG. 2, the test executive includes three run-time operator interfaces 202 provided to the end user in both source and executable form. Each run-time operator interface 202 is preferably a separate application program. The operator interfaces 202 differ primarily based on the language and application development environment in which each is developed. In FIG. 2, run-time operator interfaces developed in LabVIEW, LabWindows/CVI and Visual Basic are included.

Although the user can use the sequence editor 212 at a production station, the runtime operator interfaces 202 are simpler and are fully customizable. Like the sequence editor 212, the run-time operator interfaces 202 allow the user to start multiple concurrent executions, set breakpoints, and single step. Unlike, the sequence editor 212, however, in the present embodiment the run-time operator interfaces 202 do not allow the user to modify sequences, and they do not display sequence variables, sequence parameters, step properties, and so on.

The user can customize one of the run-time operator interfaces 202 by modifying the source code for the program and the source documents for the manual. If the user desires to write his/her own run-time operator interface 202, the source code of one of the run-time operator interfaces 202 is used as a starting point.

Test Executive Engine

The test executive engine 220 is used for creating, editing, executing, and debugging sequences. In one embodiment, the test executive engine 220 comprises a set of DLLs that export an object-based or component-based API, preferably an ActiveX Automation API. The sequence editor 212 and run-time operator interfaces 202 use a Test Executive Engine API (Engine API). The user can call the Engine API from any programming environment that supports access to ActiveX Automation servers. Thus, the user can call the Engine API from test modules, including test modules that are written in LabVIEW and LabWindows/CVI.

Module Adapters

Most steps in a test executive sequence invoke code in another sequence or in a code module. When invoking code in a code module, the test executive must know the type of the code module, how to call it, and how to pass parameters to it. The different types of code modules may include LabVIEW VIs, C functions in DLLs, and C functions in source, object, or library modules that are created in LabWindows/CVI or other compilers. The test executive also must know the list of parameters that the code module requires.

In the preferred embodiment, the test executive uses module adapters 240 to obtain this knowledge. In one embodiment, the test executive provides the following module adapters:

DLL Flexible Prototype Adapter—Allows the user to call C functions in a DLL with a variety of parameter types.

LabVIEW Standard Prototype Adapter—Allows the user to call any LabVIEW VI that has the test executive standard G parameter list.

C/CVI Standard Prototype Adapter—Allows the user to call any C function that has the test executive standard C parameter list. The function can be in an object file, library file, or DLL. The C function can also be in a source file that is in the project that the user is currently using in the LabWindows/CVI development environment.

Sequence Adapter—Allows the user to call subsequences with parameters.

The module adapters 240 contain other important information besides the calling convention and parameter lists. If the module adapter 240 is specific to an application development environment (ADE), the adapter knows how to bring up the ADE, how to create source code for a new code module in the ADE, and how to display the source for an existing code module in the ADE. The DLL Flexible Prototype Adapter can query a DLL type library for the parameter list information and display it to the sequence developer.

Test Executive Building Blocks

The following sections provide an overview of features and building blocks that are used to create test sequences and entire test systems in one embodiment of a test executive application. It is noted that these sections describe one specific embodiment, but the ideas and features may be applied to or are altered for many other test executive applications.

Variables and Properties

The test executive application provides the user various places, referred to as variables and properties, in which data values can be stored. Variables are properties that the user can freely create in certain contexts. Variables can be global to a sequence file or local to a particular sequence. The values of "station" global variables are persistent across different executions and even across different invocations of the sequence editor 212 or run-time operator interfaces 202. The test executive engine maintains the value of station global variables in a file on the run-time computer.

Each step in a sequence can have properties. For example, a step might have an integer error code property or properties affecting execution of the step. A step may have step-specific properties, or the type of a step may determine the set of properties that are associated with the step. Step types are discussed below.

Test executive variables can be used to share data among tests that are written in different programming languages, even if they do not have compatible data representations. Values that are stored in variables and properties can be passed to code modules. The test executive ActiveX API is useable to access variable and property values directly from code modules. When executing sequences, the test executive maintains a "sequence context" that contains references to all global variables and all local variables and step properties in active sequences. The contents of the sequence context change depending on the currently executing sequence and step. If the user passes a sequence context object reference to the code module, the test executive ActiveX API can be used to access the variables and properties in the sequence context.

1. Expressions

The values of variables and properties can be used in numerous ways, such as passing a variable to a code module or using a property value to determine whether to execute a step. Sometimes the user desires to use an expression, which is a formula that calculates a new value from the values of multiple variable or properties. An expression can be used anywhere a simple variable or property value is used. In expressions, the user can access all variables and properties in the sequence context that is active when the test executive evaluates the expression. The following is an example of an expression:

Locals.MidBandFrequency=(Step.HighFrequency+Step.LowFrequency)/2

The test executive may support all applicable expression operators and syntax that are used in C, C++, Java, and Visual Basic. The test executive may also provide an expression browser dialog box that the user can access, if the user is not familiar with expressions in these standard languages. The expression browser allows the user to interactively build an expression by selecting from lists of available variables, properties, and expression operators. The expression browser also lists a number of functions that the user can use in expressions. The expression browser has help text for each expression operator and function.

Categories of Properties

A property is a container of information. A property can contain a single value, an array of values of the same type, or no value at all. A property can also contain any number of sub-properties. Each property has a name.

A value is a number, a string, or a Boolean. Values are not containers and thus cannot contain sub-properties. Arrays of values can have multiple dimensions.

The following are examples of categories of properties in one embodiment according to the kinds of values they contain:

A "single-valued" property contains a single value, e.g., Number properties, String properties, and Boolean properties.

An "array" property contains an array of values, e.g., Number Array properties, String Array properties, and Boolean Array properties.

A "property-array" property contains a value that is an array of subproperties of a single type. In addition to the array of sub-properties, property-array properties can contain any number of subproperties of other types.

An "object" property contains no values. Typically, object properties contain multiple sub-properties. Object properties are analogous to structures in C/C++ and to clusters in LabVIEW.

Standard and Custom Named Data Types

When the user creates a variable or property, the user specifies its data type. In some cases, a simple data type such as a number or a Boolean is used. In other cases, the user can define his/her own data type, by creating a named data type, in which subproperties are added to create an arbitrarily complex data structure. When a named data type is created, the user can reuse the named data type for multiple variables or properties. Although each variable or property that the user creates with a named data type has the same data structure, the values they contain can differ.

The test executive may define certain standard named data types. The user can add sub-properties to the standard data types, but cannot delete any of their built-in sub-properties. The standard named data types are Path, Error, and CommonResults.

The user can define his/her own custom named data types. The user must choose a unique name for each of the custom data types. Sub-properties in each custom data type can be added or deleted without restriction. For example, the user might create a "Transmitter" data type that contains sub-properties such as "NumChannels" and "Power Level".

When the user creates a variable or property, the user can select from among the simple property types and the named data types.

Built-In and Custom Properties

The test executive defines a number of properties that are always present for objects such as steps and sequences. An example is the step run mode property. The test executive normally hides these properties in the sequence editor, although it allows the user to modify some of them through dialog boxes. Such properties are called built-in properties.

The user can define new properties in addition to the built-in properties. Examples are high and low limit properties in a step or local variables in a sequence. Such properties are called "custom" properties.

Steps

A sequence comprises a series of steps. A step can do many things, such as initializing an instrument, performing a complex test, or making a decision that affects the flow of execution in a sequence. Steps can performs these actions through several types of mechanisms, including jumping to another step, executing an expression, calling a subsequence or calling an external code module. The term "step module" is used to refer to the code module that a step calls.

Steps can have custom properties. For steps that call code modules, custom step properties are useful for storing parameters to pass to the code module for the step. They also serve as a place for the code module to store its results. The test executive ActiveX API can be used to access the values of custom step properties from code modules.

Not all steps call code modules. Some steps perform standard actions that the user configures using a dialog box. In this case, custom step properties are useful for storing the configuration settings that the user specifies.

Built-In Step Properties

Steps have a number of built-in properties that the user can specify using the various tabs on the Step Properties dialog box. These built-in step properties include:

Preconditions allow the user to specify the conditions that must be true for the test executive to execute the step during the normal flow of execution in a sequence.

Load/Unload Options allow the user to control when the test executive loads and unloads the code modules or subsequences that each step invokes.

Run Mode allows the user to skip a step or to force it to pass or fail without executing the step module.

Record Results allow the user to specify whether the test executive stores the results of the step in a list. This is discussed further below with respect to Results Collection.

Step Failure Causes Sequence Failure allows the user to specify whether the test executive sets the status of the sequence to "Failed" when the status of the step is "Failed".

Ignore Run-Time Errors allows the user to specify whether the test executive continues execution normally after the step even though a run-time error occurs in the step.

Post Actions allows the user to execute callbacks or jump to other steps after executing the step, depending on the pass/fail status of the step or any custom condition.

Loop options allow the user to cause a single step to execute multiple times before executing the next step. The user can specify the conditions under which to terminate the loop. The user can also specify whether to collect results for each loop iteration, for the loop as a whole, or for both.

Pre Expressions allows the user to specify an expression to evaluate before executing the step module.

Post Expression allows the user to specify an expression to evaluate after executing the step module.

Status Expression allows the user to specify an expression to use to set the value of the "status" property of the step automatically.

Step Types

In the specific embodiment under discussion, each step has a step type in a similar manner to which each variable or property has a data type. A step type can contain any number of custom properties. (It is noted that other embodiments of test executive applications may not support step types, but may still allow properties to be associated with individual steps.) Each step of a step type, also referred to as an instance of the step type, has the custom step properties in addition to the built-in step properties. All steps of the same type have the same properties, but the values of the properties can differ. The step type specifies the initial values of all the step properties. When the user creates the step in the sequence editor, the test executive sets the initial or default values of the step properties from the values that the step type specifies. The user can modify the values of the built-in step properties by using the Step Properties dialog box. Usually, the user can modify the values of custom step properties using a dialog box specific to the step type. If the step type does not have a dialog box for the custom properties, the user can view the custom properties by selecting "View Contents" from the context menu for the step. Although step modules typically do not modify the values of the built-in step properties at run-time, they often modify and interrogate the values of the custom step properties.

A step type essentially comprises a custom set of properties and/or operations associated with a step. Stated another way, a step type defines common operations and/or data that are associated with a test module in a similar way that a process model defines functionality associated with calling the main sequence. A step type is also similar to a data type for a variable or property. The test module is hard coded, and the step type represents operations and/or properties associated with calling this test module. A step type is a modular, identifiable unit configured by the user, preferably through a graphical user interface, e.g., dialogs.

In a test sequence with a number of steps, in many instances the user will desire a number of steps that have some commonality of functionality and/or properties. A primary purpose of a step type is to define, in a single location, common properties and/or operations associated with a plurality of steps referred to as the step type, thereby eliminating the need for the user to define these common properties and/or operations with each of the respective steps. The user can thus incorporate this common functionality and/or properties in a step type, rather than requiring the user to hard code that functionality and/or properties in each step. The functionality and/or properties defined by a step type is generally peripheral or associated with the actual test or the step being performed.

For example, it may be desirable to handle the return data a certain way, and the user desires this return data handling functionality for a number of different steps. According to the present invention, the user has the ability to create a step type which defines this commonality, i.e., defines a standard way that that step type will handle the data. Therefore the step type makes it easier to reuse return data handling code for all the steps that will have that same common functionality of handling data. Thus steps (instances) of this type are easier to configure, since the common functionality does not need to be re-coded for each step. The user also may want to define properties around a class of steps to provide more configurability. This is done by creating or configuring a step type for the class of steps, wherein the step type defines the common properties.

As discussed below, step types define common functionality by defining an edit substep and pre and post substeps. The edit substep vs. the pre and post substeps are similar to the configuration entry point vs. execution entry point in the process model.

The edit substep allows the user to configure the peculiarities of a particular instance of a step type. For instance the edit substep can be configured to display or pop up a message to request user input regarding the number of buttons desired on a dialog. This message is displayed at configuration time, not run time.

As discussed above, step types can contain custom properties in addition to built-in step properties. The step type specifies the initial values of the step properties. The step type can also define standard behavior for each step of the respective step type, preferably using sub-steps, e.g., an edit sub-step, pre-step sub-step and post-step sub-step.

In creating the steps in a sequence, the user may want to select existing step types which will be common for one or more steps he/she is using in his sequences or he/she may want to configure new step types for a certain type of step he/she will want to habitually use or use a plurality of times in a sequence.

A step type has similar functionality to a type definition, meaning that once the user has configured a step type and used it throughout different steps of the sequence, if the user later changes that step type, those changes propagate through all of the steps (instances) which are based on that step type.

In prior art test executives, the functionality performed by the step type of the present invention was hard coded in the test executive itself and was not easily changeable. Further, this functionality was not in a modular form which could be reused or applied to a plurality of steps. The step type of the present invention embodies this functionality, e.g., the pre and post operations in a typical test, and places this in a configurable and reusable form. Step types of the present invention are modular and user configurable and provide tremendous savings in developer effort.

There are basically three different types of step types: step types that call code modules through any module adapter like CVI or LabVIEW; step types that require a particular module adapter; and step types that do not call code modules.

A step type can also define standard behavior for each step of that type. The step type does this using a set of "substeps". Substeps are actions that the test executive engine performs for a step besides calling the step module. The substeps of a step type perform the same actions for every step of that type. The different types of substeps are as follows:

Edit substep
Pre-step substep
Post-step substep

The sequence developer invokes the edit substep by selecting a menu item in the context menu for the step or by clicking a button on the Step Properties dialog for the step. The step type specifies the name of the menu item and the caption of the button. The edit substep displays a dialog box in which the sequence developer edits the values of custom step properties. For example, an edit substep might display a dialog box in which the sequence developer specifies the high and low limits for a test. The edit substep might then store the high and low limit values as step properties.

The engine 220 calls the pre-step substep before calling the step module. The user can specify an adapter and a module to invoke in the pre-step substep. For example, a pre-step substep might call a code module that retrieves measurement configuration parameters into step properties for use by the step module.

The engine 220 calls the post-step substep after calling the step module. The user can specify an adapter and a module to invoke in the post-step substep. A post-step substep might call a code module that compares the values that the step module stored in step properties against limit values that the edit substep stored in other step properties.

The test executive contains a set of predefined step types. These include:

Action
Numeric Limit Test
String Value Test
Pass/Fail Test
Label
Goto
Statement
Limit Loader
Message Popup
Call Executable
Call Sequence Although the user can create a test application using only the predefined step types, the user can also create his/her own step types. By creating his/her own step types, the user can define standard, reusable classes of steps that apply specifically to the user's application. For example, the user might define a Switch Matrix Configuration step or a Transmitter Adjacent Channel Power Test step.

The sequence developer creates a new step by selecting the "Insert Step" item in the context menu that appears when the user right click on a sequence window. The "Insert Step" item brings up a hierarchical submenu containing the step types available on the computer. When the user creates a new step type, the user specifies its name and position within the submenu.

Source Code Templates

When the user creates a step type, the user can also define source code templates for that step type. When the sequence developer creates a new step of that type, the developer can use a source code template to generate source code for the step module. For a particular step type, the user can specify different source code templates for the different module adapters.

Sequences

In one embodiment, a sequence may comprise:
Any number of local variables
Any number of parameters
A main group of steps
A group of setup steps
A group of cleanup steps
Built-in sequence properties Sequence Parameters Each sequence has its own list of parameters. The user can specify the number of parameters and the data type of each parameter. The user can also specify a default value for each parameter. When the sequence developer creates a step that calls one sequence from another, the developer can specify the values to pass for the parameters of the subsequence. If the developer does not specify the value of a parameter, the test executive engine 220 passes the default value. The user can use the test executive ActiveX API to access sequence parameter values from code modules that steps in the sequence call.

Sequence Local Variables

The user can create an unlimited number of local variables in a sequence. The user can use local variables to store data relevant to the execution of the sequence. The user can use the test executive ActiveX API to access local variables from code modules that steps in the sequence call. The user can also pass local variables by value or by reference to any step in the sequence that calls a subsequence or that calls a DLL using the Flexible DLL Prototype Adapter.

Lifetime of Locals Variables, Parameters, and Custom Step Properties

Multiple instances of a sequence can run at the same time. This can occur when the user calls a sequence recursively or when a sequence runs in multiple concurrent executions. Each instance of the sequence has it own copy of the sequence parameters, and local variables, and custom properties of each step. When a sequence completes, the test executive engine 220 discards the values of the parameters, local variables, and custom properties.

Step Groups

A sequence can contain the following groups of steps: Setup, Main, and Cleanup. When the test executive executes a sequence, the steps in the Setup group execute first. The steps in the Main group execute next. The steps in the Cleanup group execute last. Typically, the Setup group contains steps that initialize instruments, fixtures, or a UUT, launches necessary applications, etc. The Main group usually contains the bulk of the steps in a sequence, including the steps that test the UUT. The Cleanup group contains steps that power down or de-initialize the instruments, fixtures, and UUT, or perform software-related cleanup if the UUT comprises a software application.

One of the reasons for having separate step groups is to ensure that the steps in the Cleanup group execute regardless of whether the sequence completes successfully or a run-time error occurs in the sequence. If a Setup or Main step causes a run-time error to occur, the flow of execution jumps to the Cleanup step group. The Cleanup steps always run even if some of the Setup steps do not run. If a Cleanup step causes a run-time error, execution continues at the next Cleanup step.

If a run-time error occurs in a sequence, the test executive engine 220 reports the run-time error to the calling sequence. Execution in the calling sequence jumps to the Cleanup group in the calling sequence. This process continues up through the top-level sequence. Thus, when a run-time error occurs, the test executive engine 220 terminates execution after running all the Cleanup steps of the sequences that are active at the time of the run-time error.

Built-in Sequence Properties

Sequences have a few built-in properties that the user can specify using the Sequence Properties dialog. For example, the user can specify that the flow of execution jumps to the Cleanup step group whenever a step sets the status property of the sequence to "Failed".

Sequence Files

Sequence files can contain one or more sequences. Sequence files can also contain global variables. Sequence file global variables can be accessed by all sequences in the sequence file. Sequences files have a few built-in properties that the user can specify using the Sequence File Properties dialog. For example, the user can specify Load and Unload Options that override the Load and Unload Options of all the steps in all the sequences in the file.

Sequences contain steps that conduct tests, set up instruments, or perform other actions necessary to test a UUT. Sequence files also contain the definitions for the data types and step types that are used by the sequences in the file. The sequence editor is used to create and edit sequence files. Sequences can be executed from the sequence editor or from any other test executive operator interface program.

The various types of sequence files include normal sequence files, model sequence files, station callback sequence files, and front-end callback sequence files. Normal sequence files contain sequences that test UUTs, and these are the most common type. Model sequence files contain process model sequences. Station callback sequence files contain station callback sequences, and front-end callback sequence files contain front-end callback sequences.

Figure 3:
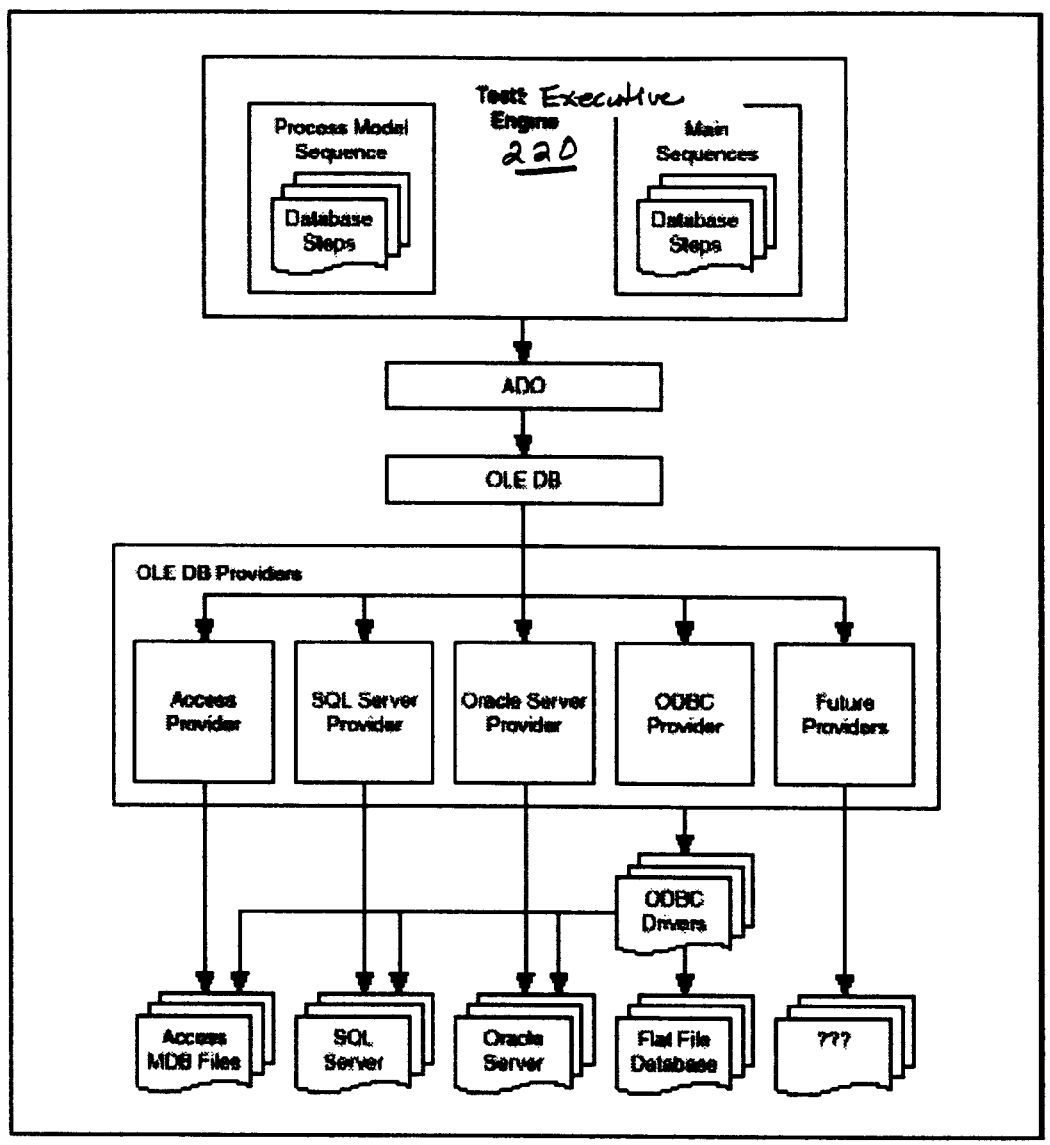
FIG. 3 illustrates one embodiment of a test executive application interfacing with a database.

FIG. 3—Exemplary Interface to Database

The test executive software may be operable to interface with a database in order to import property or variable values from or export the values to the database. In various embodiments, the test executive may interface with any of various types of databases, including relational and object-oriented databases. Any of various models or methodologies may be utilized to communicate with the database. As described above, a database may be located on the same computer system on which the test executive runs or on a different computer system.

FIG. 3 illustrates one particular embodiment, in which the test executive uses the ActiveX Data Objects (ADO) model to interface with a database. As shown, ADO is built on top of the Object-linking and Embedding Database (OLE DB). Applications that use ADO, such as the test executive engine 220 shown in FIG. 3, use the OLE DB interfaces indirectly. The OLE DB layer interfaces to databases directly through a specific OLE DB provider for the DBMS or through a generic Open Database Connectivity (ODBC) provider, which interfaces to a specific ODBC driver for the DBMS. Specific databases shown in FIG. 3 include Oracle, Microsoft SQL Server, and Microsoft Access.

Figure 4:
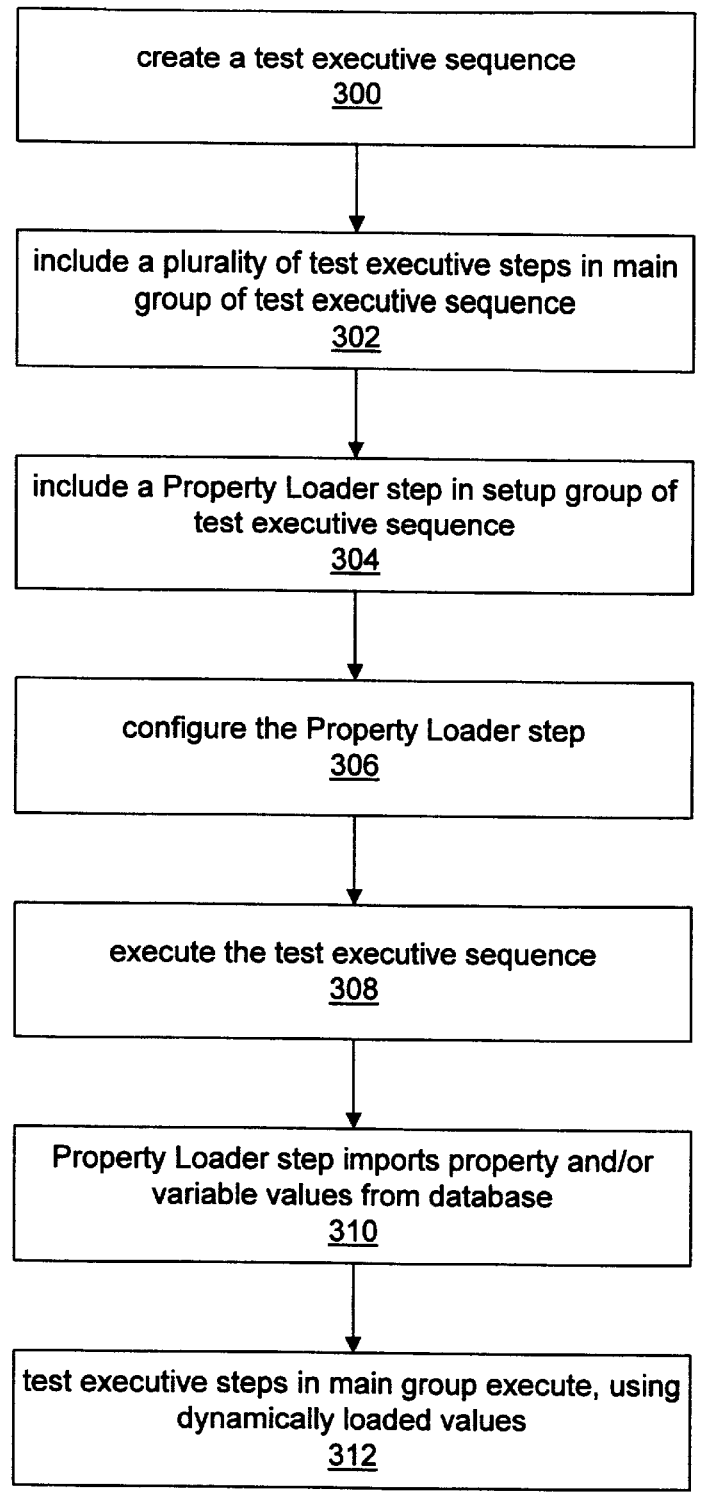
FIG. 4 is a flowchart diagram illustrating one embodiment of a method that utilizes a Property Loader step to dynamically configure a test executive sequence.

FIG. 4—Using Property Loader Steps

The test executive preferably supports a built-in step type referred to as a "Property Loader" step, which is operable to load the values for properties and variables from a database dynamically at run time. As an example, a user may develop a common sequence that can test two different models of a device, where each model requires unique limit values for each step. If step properties are used to hold the limit values, then the user may include a Property Loader step in the sequence to import the correct limit values into the step properties from a database. The Property Loader step would typically be placed in the Setup step group of a sequence. In this way, the Property Loader step initializes the property and variable values before the steps in the Main step group execute.

FIG. 4 is a flowchart diagram illustrating one embodiment of a method that utilizes a property loader step to dynamically (i.e., at run time) configure a test executive sequence.

In step 300, the user creates a test executive sequence. For example, this may comprise opening or creating a sequence file, receiving a user interface command to create the test executive sequence, displaying a user interface enabling the user to edit the sequence, etc.

In step 302, the user includes a plurality of test executive steps in the test executive sequence. The plurality of steps included in step 302 preferably define a series of steps that, when executed, result in performing a test of the unit under test (UUT), e.g., by calling various code modules. Thus, the plurality of steps may be included in a Main group associated with the sequence.

In step 304, the user includes a Property Loader step in the test executive sequence. As discussed above, the Property Loader step may be included in a Setup group associated with the sequence.

In step 306, the user provides configuration information, e.g., via a graphical user interface, specifying the desired operation of the Property Loader step, such as which property and/or variable values to load from the database. One embodiment of step 306 is discussed in detail below.

In step 308, the user may request execution of the test executive sequence. The sequence may be executed at some later time after performing steps 302–306. For example, after creating and configuring the test executive sequence, the user may save and close the sequence file. Steps 308–310 may then be performed in order to actually run tests on a unit under test (UUT).

Executing the test executive sequence comprises executing the Property Loader step included in the sequence. As shown in step 310, when the Property Loader step executes, the step is operable to interface with the database and dynamically load the property and/or variable values specified in step 306.

In step 312, the test executive steps included in the Main group execute. The Property Loader step is preferably configured in step 306 to load database values for properties associated with one or more of these steps. Thus, the values loaded from the database in step 310 may affect the execution of the test executive sequence. Also, one or more values for variables associated with the sequence may be loaded in step 310, which may also affect the execution of the sequence.

It is noted that in alternative embodiments, a test executive sequence may be configured to dynamically load property/variable values from a database using methods other than including a property loader step in the sequence. For example, the test executive sequence may maintain information regarding data values to be loaded as a portion of the sequence data, wherein this information may be specified by user interface dialogs that may be invoked via a menu item accessible while editing a test executive sequence. In other words, the data import information is not necessarily included in a sequence step but may be associated with the sequence in any of various ways, and when the sequence is executed, the test executive engine may be operable to use the information to load the specified property/variable values from a database. Thus, while the preferred embodiment of the invention uses a Property Loader step to indicate that property/variable values should be loaded from a database, it is noted that this may be accomplished using various different methods.

Figure 5:
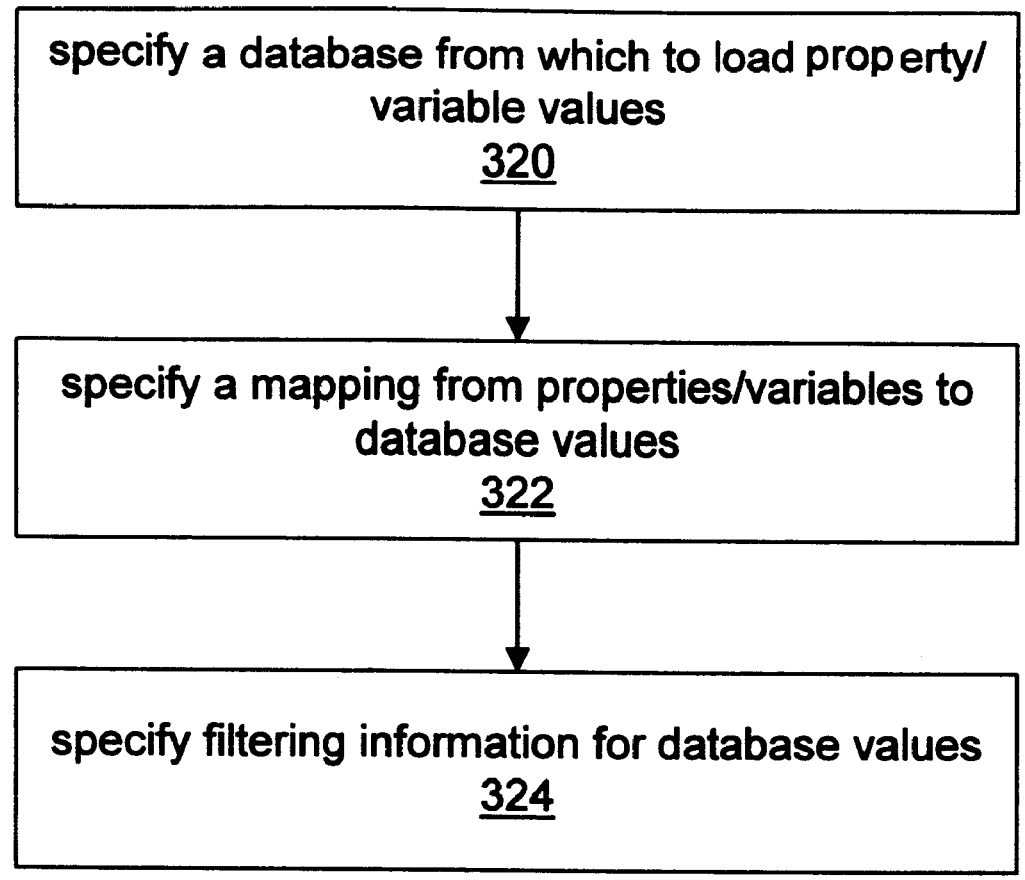
FIG. 5 is a flowchart diagram illustrating one embodiment of a method for specifying information for configuring a Property Loader step to load desired property and/or variable values from a database.

FIG. 5—Configuring the Property Loader Step

In various embodiments, step 306 of FIG. 4 may comprise specifying any of various types of information in order to configure the Property Loader step to load the desired property and/or variable values from a database. FIG. 5 is a flowchart diagram illustrating one embodiment of step 306.

In step 320, information specifying a particular database from which to load property/variable values may be received. In one embodiment, this step comprises receiving a data link name, wherein the data link includes a name of a server, a name of a database, a user ID, and a password. The data link may be configured from the test executive environment or from within database client software included on the computer system.

In step 322, information specifying a mapping of the desired properties and/or variables for which to load values to database values is received. For example, step 322 may comprise specifying a database table and a mapping of properties/variables to columns in the table. For other types of databases, e.g., object-oriented databases, this mapping may be specified in any of various other ways. Exemplary user interface dialog boxes for specifying the mapping are discussed below.

In step 324, filtering information may optionally be received. Filtering information may specify criteria to use in deciding whether or not to load a property/variable value from a database. For example, the filtering information may specify that values should only be imported from the database if a particular column value is set to a specified value or satisfies a specified Boolean expression. Otherwise, for example, default values may be used for the properties/variables.

It is noted that in embodiments which do not utilize Property Loader steps, information such as shown with reference to FIG. 5 may be associated with the test executive sequence but may not be associated with a particular step.

FIGS. 6—12: Examples

FIGS. 6–12 illustrate graphical user interface dialogs associated with a particular embodiment of a test executive application that supports the dynamic loading of property and variable values from a database. As discussed below, the user interface also comprises menu options enabling a user to import or export property/variable values from/to a database at edit-time. For example, sequence steps may first be configured with desired property values, and these property values may then be automatically exported to a database, so that they can be imported later for the same sequence or for another sequence that uses a Property Loader statement to import the values.

For more information on the embodiment shown in FIGS. 6–12, please refer to the above-incorporated TestStand documentation.

In the examples of FIGS. 6–12, values to be loaded from a database are stored in the database in a table format and are imported via a SQL statement. As shown in FIG. 6, each row in the table pertains to a particular sequence step or to a variable scope. The column headings are the names of properties or variables in the steps or scopes. Not all columns apply to each row. Each row has values only for the columns that define properties or variables that are actually in the step or variable scope for the row.

The Property Loader step can filter the data the SQL statement returns so that only values from rows that contain specific column values are loaded. For example, for FIG. 6, only rows having a value of "Phone Test.seq" in the "SEQUENCE NAME" column may be loaded.

Figure 7:
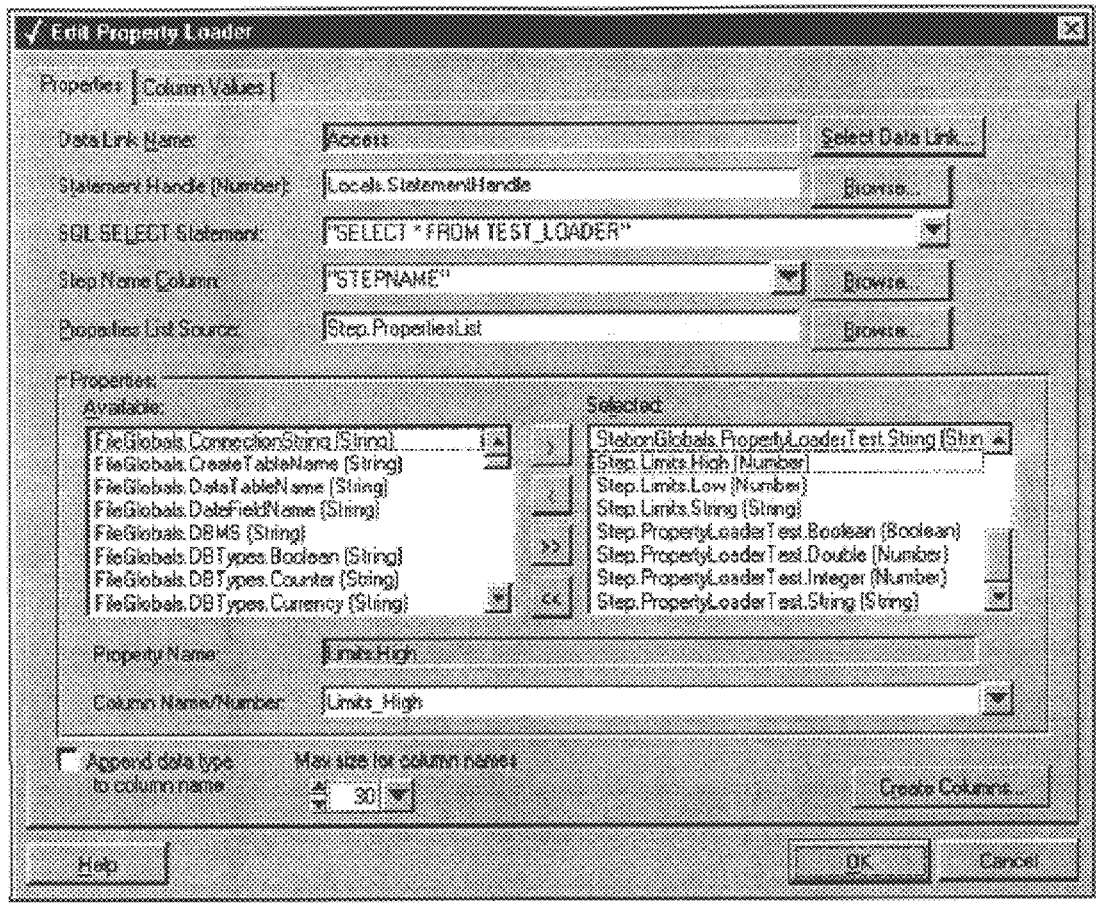

An Edit Property Loader dialog box may be used to specify configuration information for a Property Loader step. FIG. 7 shows the Properties tab of the Edit Property Loader dialog box. The Properties tab contains the following controls:

Data Link Name—Contains the name of the data link that the dialog box uses to populate the Step Name Column ring control and to create columns (described below). The Select Data Link button may be used to select a predefined data link from a list. The data link may specify information regarding the database, such as a name of a server, a name of a database, a user ID, a password, etc.

Statement Handle (Number)—Specifies the name of the variable or property that contains the SQL statement handle the step uses to import values at run time. The variable or property is of the Number data type.

SQL SELECT Statement—Specifies the SQL statement the dialog box uses at edit time to create columns and populate ring controls that contain column names. The SQL SELECT Statement ring control contains a list of steps of type Open SQL Statement in the current sequence file. Open SQL Statement steps are used to select data from a database. The selected SQL statement step must use a string literal or an expression that is valid at edit time.

Step Name Column—Specifies the name of the SQL statement column that contains the names of the sequence steps and variable scopes that define the rows of data, e.g., the "STEPNAME" column of FIG. 6.

Properties List Source—Specifies the name of a variable or property in which to store the property mappings the step performs. The variable or property must be an array of type DatabasePropertyMapping.

Properties—Specifies the mapping of column names to variables or properties that the step loads. The section contains two lists of variables and properties. The first list contains the properties and variables that are available but not selected. The second list contains the properties and variables select by the user. A single property can be moved from one list to the other by clicking on the single arrow buttons. The double arrow buttons move all properties from one list to the other. The Property Name control displays the currently selected property in the Selected list control. The Column Name/Number control specifies the name of the column from which the step loads the currently selected property.

Append data type to column name—Specifies whether the name of the data type of a property is automatically appended to the column name for a property when a property is selected from the Available list.

Max size for column names—Specifies the maximum number of characters for a column name. Many databases limit the size of a column name. Use the ring control to select the limit for any DBMS supported by default.

Create Columns—Displays the Create Columns dialog box. The dialog box is automatically populated with the list of column names that are selected by the user but that the SQL statement does not return. The Create Columns dialog box is typically used to add new columns to a database table for any newly selected properties.

The Browse button can be used to display an Expression Browser dialog box for a control that contains a test executive expression.

Figure 8:
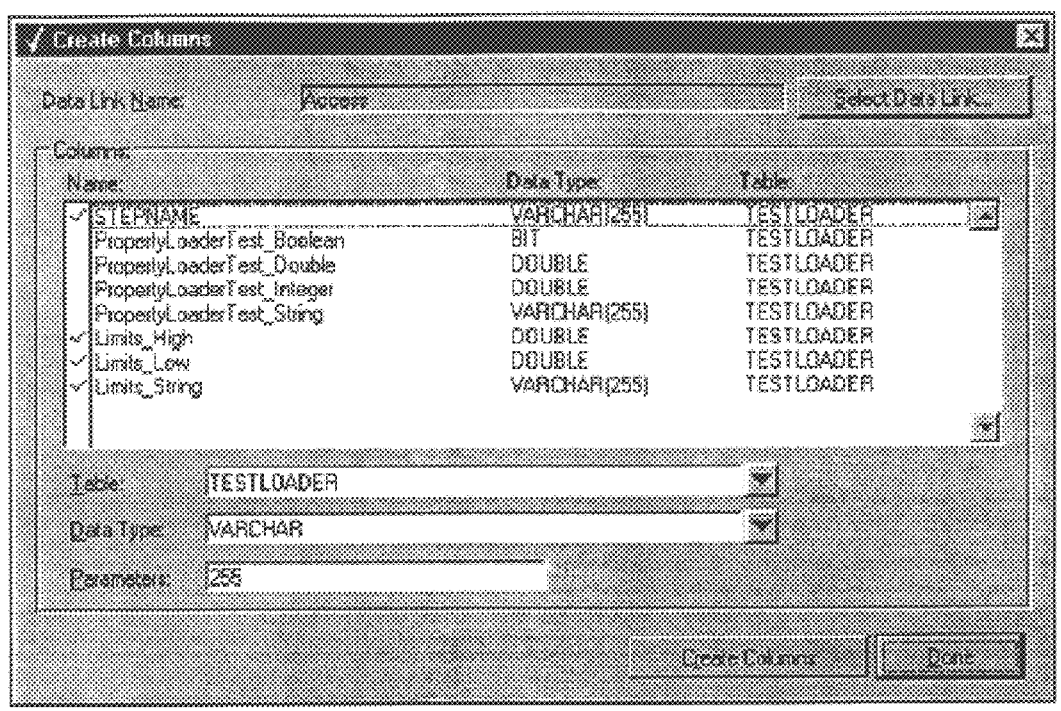

FIG. 8 shows the Create Columns dialog box. The Create Columns dialog box contains the following controls:

Data Link Name—Contains the name of the data link to create columns with. Use the Select Data Link button to select a predefined data link from a list.

Columns—Contains the column names that were selected in the Edit Property Loader dialog box but that are not in the specified SQL statement. The Table control specifies the table in which to create the checked columns. The Data Type control specifies the column data type. The Parameters control specifies any parameter information for the data type. For example, a size limit for a character data type can be specified by entering a number in the Parameters control.

Create Columns—Creates columns for the checked items in the Columns list control.

Figure 9:
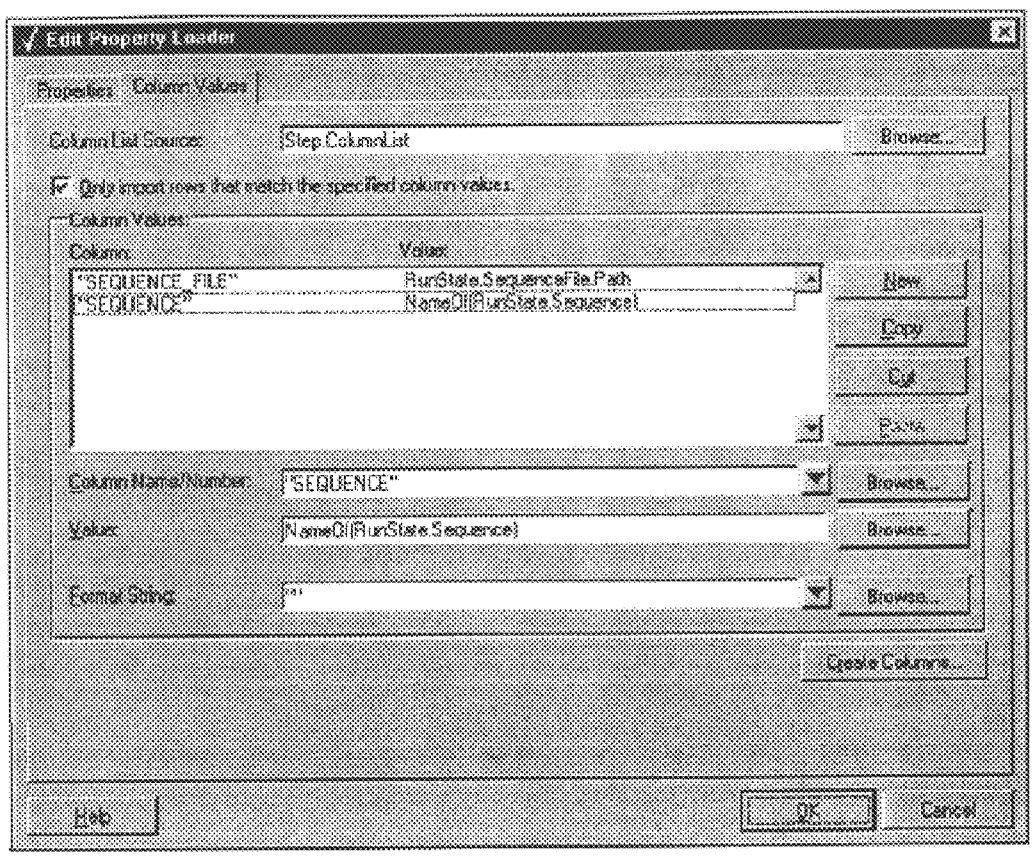

FIG. 9 shows the Column Values tab of the Property Loader dialog box. The Column Values tab of the Edit Property Loader dialog box allows data the SQL statement returns to be filtered so that only values from rows that contain specific column values are loaded. The Column Values tab contains the following controls:

Column List Source—Specifies the name of the variable or property in which to store the list of column value comparisons. The variable or property must be an array of type DatabaseColumnValue.

Only import rows that match the specified column values—Specifies whether the step loads only the rows that match the specific column values. When this control is not checked, the Column Values section is dimmed.

Column Values—Specifies the columns values that each row must match. The Column Name/Number, Values, and Format String controls specify the settings for the currently selected mapping. The New, Cut, Copy, and Paste buttons can be used to create a new item in the list, remove items from the list, and rearrange the items in the list.

The Column Name/Number, Values and Format String controls must contain valid expressions that the test executive evaluates at run time. To refer to a column by its order in the SQL statement, enter a one-based number without surrounding quotes in the Column Name/Number field.

The Format String control specifies how to convert a string value when comparing a column value to a string expression. Typically, this control is used when comparing data from a column that is of the date-time or currency type.

Create Columns—Displays the Create Columns dialog box. The test executive automatically populates the dialog box with the list of any column names that are specified and that the SQL statement does not return. The Create Columns dialog box is typically used to add new columns to a database table.

The Browse button can be used to display an Expression Browser dialog box for a control that contains a test executive expression.

Custom Properties

The Property Loader step type defines the following step properties in addition to the common custom properties:

Step.StatementHandle specifies the name of the variable or property that contains the SQL statement handle the step uses at run time to load values.

Step.SQLStatement specifies the SQL statement the Edit Property Loader dialog box uses to populate ring controls that contain column names.

Step.StepNameColumn specifies the name of the column in the SQL Statement that contains the names of the steps and variable scopes that define the rows of data.

Step.ColumuListSource specifies the name of the variable or property that stores the list of column comparisons used to filter the rows of SQL data. The variable or property must be an array of type DatabaseColumnValue. By default, the value is Step.ColumnList.

Step.ColumnList specifies the column comparisons made on a SQL statement row before loading its values into properties. This property must be an array of type DatabaseColumnValue. The DatabaseColumnValue custom data type contains the following subproperties:

ColumnName specifies the name of the column to perform the comparison on.

ColumnNumber indicates the number of the column in the SQL statement.

Data specifies the expression evaluated at run time to compare against the column value.

FormatString specifies an optional format string for dates, times, and currencies. Use an empty string (" ") for the default format.

Step.PropertiesListSource specifies the name of the variable or property that stores the list of variables and properties into which to load data. The variable or property must be an array of type DatabasePropertyMapping. By default, the value is Step.PropertiesList.

Step.PropertiesList specifies the list of variables and properties into which to load data. The list must be an array of type DatabasePropertyMapping. Each element of the array defines a mapping between a SQL statement column and a variable or property. The DatabasePropertyMapping custom data type contains the following subproperties:

PropertyName specifies the name of the property or variable to assign a value to.

PropertyType specifies the scope of the property or variable, such as step, local, file global, or station global. Valid values include:
0—Step
1—Local
2—File Global
3—Station Global DataType specifies the type of the property. Valid values include:
1—Boolean
2—Number
3—String ColumnName specifies the name of the column to get the value from.

Step.AppendTypeName specifies whether to append the data type name of the property to the column name when selecting a property from the available list.

Step.MaxColumnSize specifies the maximum number of characters for a column name.

Step.FilterUsingColumnList specifies whether the step loads only the rows that match the specific column value.

Step.Result.NumPropertiesRead indicates the total number of values that the step loaded from the SQL statement.

Step.Result.NumPropertiesApplied indicates the total number of values the step assigned to properties or variables. If this number is less than Step.Result.NumPropertiesRead, the step was unable to update properties or variables.

Importing/Exporting Properties at Edit Time

A user may use an Import/Export Properties command interactively to import values from a database into step properties or variables or to export values from step properties or variables to a database. The Import/Export Properties command displays the Import/Exports Properties dialog box. The dialog box contains three tabs: Select Record Set, Properties, and Additional Columns. The Import/Export Properties dialog box contains the following controls below the three tabs:

Export—Exports the properties and variables specified on the Properties tab and Additional Columns tab to the database. The ring control to the left of the Export button specifies whether to create new records in the database or to overwrite any previously written records for the step or variable group. If the Additional Columns tab specifies column values that match a record, only the records that match these specified values are overwritten.

Import—Imports the properties and variables specified on the Properties tab and Additional Columns tab from the database.

Done—loses the Import/Export Properties dialog box.

Figure 10:
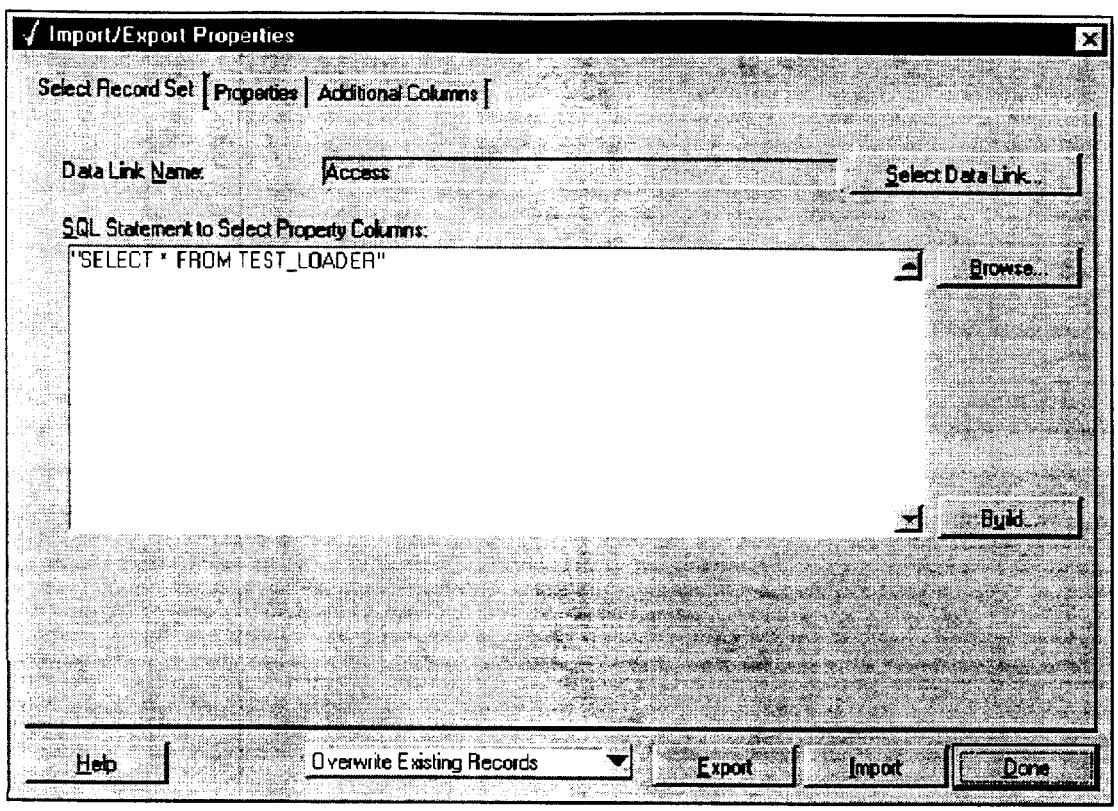

The Select Record Set tab specifies the Data Link and SQL Statement the dialog box uses when importing and exporting properties. FIG. 10 shows the Select Record Set tab of the Import/Export Properties dialog box. The Select Record Set tab contains the following controls:

Data Link Name—Contains the name of the data link the dialog box uses to import and to export. Use the Select Data Link button to select a predefined data link from a list.

SQL Statement to Select Property Columns—Specifies the SQL statement the dialog box uses to import and export property and variable values. The SQL statement must return a record set that includes the column names that are specified. Use the Build button to construct the SQL statement. Use the Browse button to display the Expression Browser dialog box.

Figure 11:
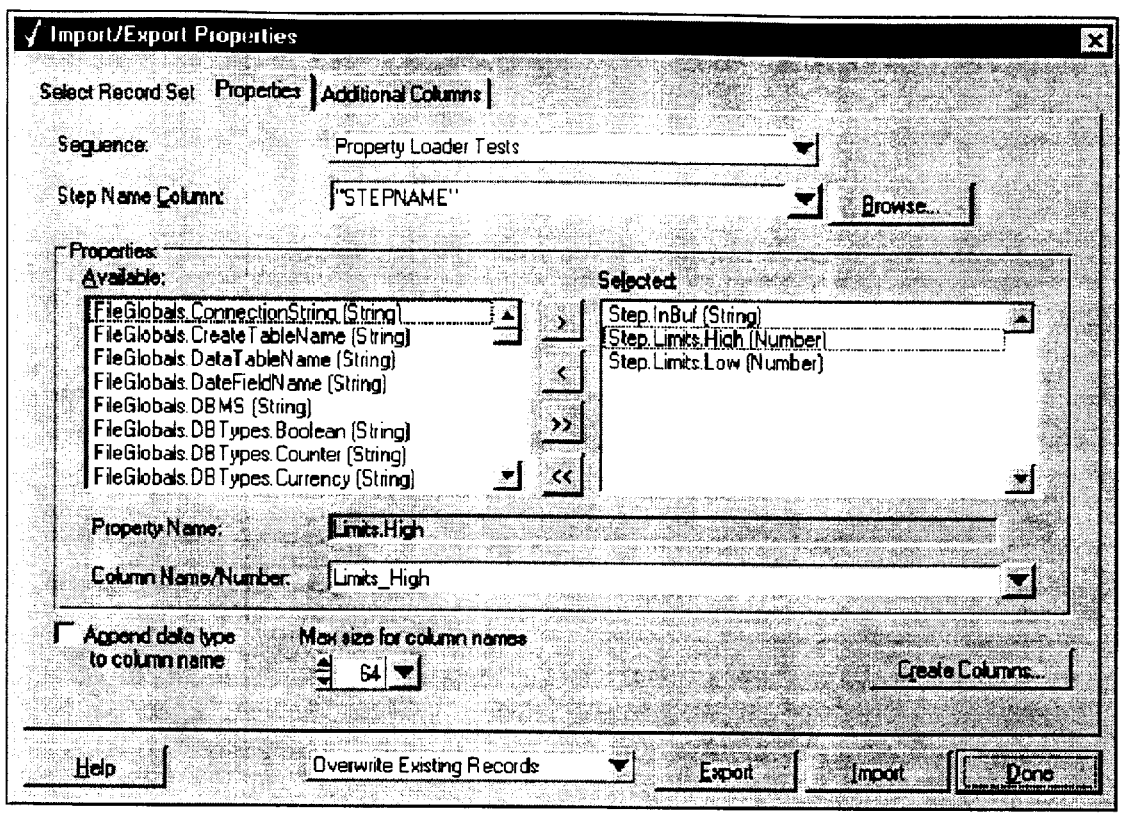

FIG. 11 shows the Properties tab of the Import/Export Properties dialog box. The Properties tab contains the following controls:

Sequence—Selects the sequence to which to import values or from which to export values.

Step Name Column—Specifies the name of the column in the SQL statement that contains the names of the sequence steps and variable scopes that define the rows of data. Use the Browse button to display the Expression Browser dialog box.

Properties—Specifies the names of variables and properties to import or export and the column names to use for them. The section contains a list of available variables and properties and a list of variables and properties that are selected. Move a single property from one list to the other by clicking on the single arrow buttons. The double arrow buttons move all properties from one list to the other.

The Property Name control displays the currently selected property in the Selected list control. The Column Name control specifies the name of the column where the step imports or exports the property.

Append data type to column name—Specifies whether to automatically append the name of the data type of a property to the column name for a property when the property is selected from the available list.

Max size for column names—Specifies the maximum number of characters for a column name. Many databases limit the size of a column name. Use the ring control to select the limits for the DBMS supported by default.

Create Columns—Displays the Create Columns dialog box. The dialog box is automatically populated with the list of any column names specified that the SQL statement does not return. The Create Columns dialog box is typically used to add new columns to a database table.

Figure 12:
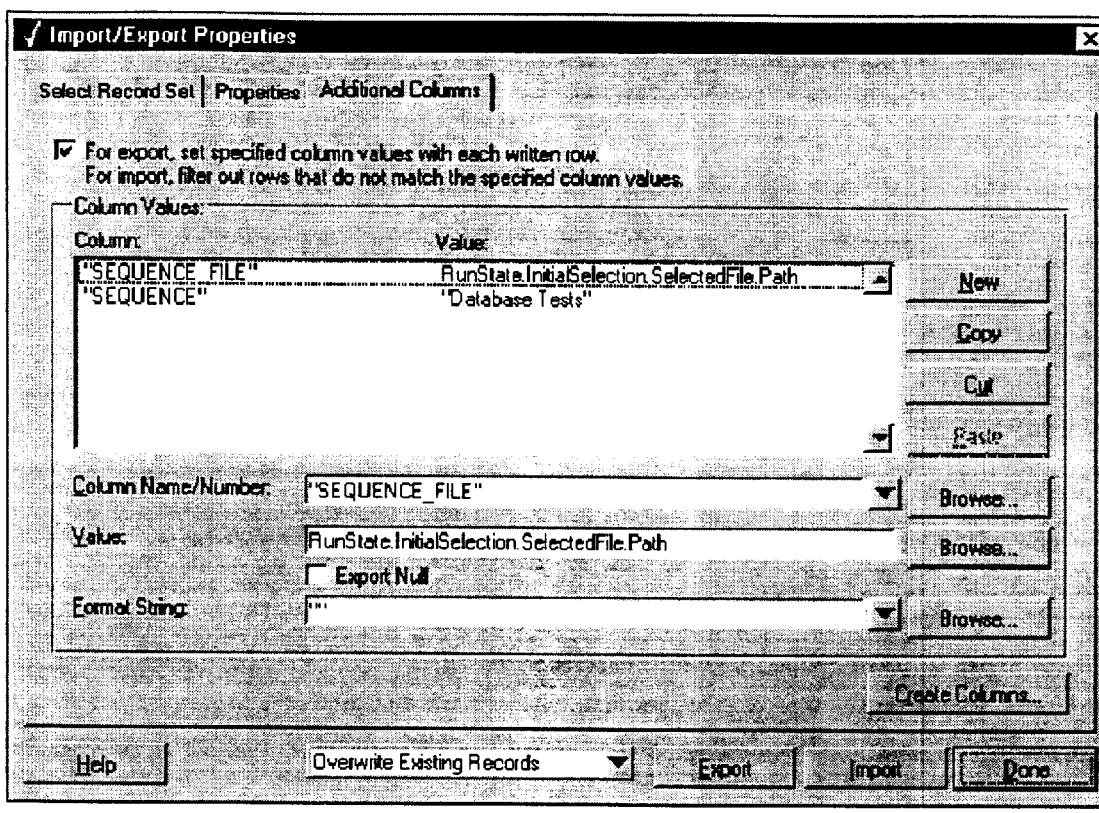

FIG. 12 shows the Additional Columns tab of the Import/Export Properties dialog box. On export, the Additional Columns tab defines the set of column values that are written to the database for each record. On import, the tab defines the column values that a record must match before values from the record are loaded. The checkbox at the top of the tab enables the controls on the Additional Columns tab. The Additional Columns tab contains the following controls:

Column Values—Specifies the mappings of column names to variables or properties. The list control displays the mappings. The Column Name/Number, Values, and Format String controls specify the settings for the currently selected mapping. Use the New, Cut, Copy, and Paste buttons to create a new item in the list, remove items from the list, and rearrange the items in the list.

The Column Name/Number, Values, and Format String controls must contain valid expressions evaluated at run time.

When exporting values, the Value control can contain a literal value or an expression that is evaluated at run time. When importing values, the Value control must contain the name of a variable or property.

The Format String control specifies how to convert a string value when comparing a column value to a string expression. Typically, this control is used when comparing data from a column that is of the date-time or currency type.

Create Columns—Displays the Create Columns dialog box. The dialog box is automatically populated with the list of any column names are specified and that the SQL statement does not return. The Create Columns dialog box is typically used to add new columns to a database table.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for dynamically configuring a test executive sequence, the method comprising:
   creating a test executive sequence comprising a plurality of test executive steps, wherein at least one of the plurality of test executive steps has one or more associated properties; and
   executing the test executive sequence, wherein said executing the test executive sequence includes importing values for the properties associated with the at least one test executive step from a database.

2. The method of claim 1,
   wherein said executing the test executive sequence further comprises executing the plurality of test executive steps;
   wherein said executing the plurality of test executive steps results in performing a test of a unit under test (UUT).

3. The method of claim 1, further comprising:
   associating at least one variable with the test executive sequence;
   wherein said executing the test executive sequence comprises importing values for the at least one variables from the database.

4. The method of claim 1, further comprising:
   including a property loader step in the test executive sequence;
   wherein said executing the test executive sequence comprises executing the property loader step;
   wherein, in response to said executing the property loader step, the property loader step is operable to import values for the properties associated with the at least one test executive step from the database.

5. The method of claim 4,
   wherein the test executive sequence includes a setup group and a main group, each group being capable of including one or more steps;
   wherein, during an execution of the test executive sequence, steps in the setup group execute before steps in the main group;
   wherein the property loader step is included in the setup group;
   wherein each of said plurality of test executive steps is included in the main group.

6. The method of claim 1, further comprising:
   configuring the test executive sequence with information regarding the values to be loaded from the database;
   wherein said configuring the test executive sequence comprises receiving user input specifying a particular database from which to import property values.

7. The method of claim 6,
   wherein said importing values from the database comprises importing the values from database columns;
   wherein said configuring the test executive sequence further comprises receiving user input specifying a mapping from the properties to the database columns.

8. The method of claim 7,
   wherein the database columns are associated with a particular database table comprising a plurality of rows;
   wherein each row of the table is associated with a particular test executive step that may be included in a test executive sequence;
   wherein said executing the test executive sequence comprises:
     importing values for properties associated with a first step in the test executive sequence from a first row of the table;
     importing values for properties associated with a second step in the test executive sequence from a second row of the table.

9. The method of claim 8, further comprising:
   associating a set of variables with the test executive sequence;
   wherein a row in the table is associated with the set of variables;
   wherein said executing the test executive sequence comprises importing values for the set of variables from the row associated with the set of variables.

10. The method of claim 7,
    wherein the database columns are associated with a particular database table comprising a plurality of rows;
    wherein each row of the table is associated with a particular test executive step that may be included in a test executive sequence;
    wherein said configuring the test executive sequence further comprises receiving user input specifying filtering information;
    wherein the filtering information includes a mapping of database columns to values;
    wherein, in order for data to be imported from a particular row during said executing the test executive sequence, it is necessary for the following to be true:

for each database column specified in the filtering information, the column value for the particular row must match the respective value specified by the filtering information.

11. The method of claim 1,
wherein said importing property values from the database comprises executing one or more SQL statements.

12. The method of claim 11, further comprising:
configuring the test executive sequence with information regarding the values to be loaded from the database;
constructing the one or more SQL statements using the configuration information.

13. The method of claim 1,
wherein the at least one of the plurality of test executive steps having one or more associated properties is an instance of a particular step type defining the one or more associated properties.

14. The method of claim 1, further comprising:
prior to said executing the test executive sequence, receiving a user command to export property values for the test executive sequence to the database;
exporting property values for the test executive sequence to the database, in response to said receiving the user command;
wherein said exporting property values for the test executive sequence comprises exporting property values for the one or more properties associated with the at least one test executive step to the database;
wherein said importing values for the properties associated with the at least one test executive step from a database comprises importing the previously exported values.

15. The method of claim 14,
wherein said exporting property values to the database comprises automatically creating one or more columns associated with the property values in the database.

16. A method for dynamically configuring test executive sequences, each including separate step instances of a particular step type, the method comprising:
creating a first test executive sequence including a first test executive step of a particular step type and a property loader step, wherein at least one property is defined by the particular step type;
creating a second test executive sequence including a second test executive step of the particular step type and the property loader step;
executing the first test executive sequence;
executing the second test executive sequence;
wherein said executing the first test executive sequence comprises executing the property loader step a first time;
wherein, in response to said executing the property loader step the first time, the property loader step is operable to import a first set of values for the at least one properties for the first test executive step from a database;
wherein said executing the second test executive sequence comprises executing the property loader step a second time;
wherein, in response to said executing the property loader step the second time, the property loader step is operable to import a second set of values for the at least one properties for the second test executive step from the database.

17. A test system for testing one or more units under test (UUTs), wherein the test system comprises:
a computer system which stores a test executive program for configuring the test system;
a database accessible from the computer system;
at least one unit under test coupled to the computer system;
wherein the test executive program is executable to:
create a test executive sequence comprising a plurality of test executive steps, wherein at least one of the plurality of test executive steps has one or more associated properties; and
execute the test executive sequence, wherein said executing the test executive sequence includes importing values for the properties associated with the at least one test executive step from a database.

18. The system of claim 17,
wherein said executing the test executive sequence further comprises executing the plurality of test executive steps;
wherein said executing the plurality of test executive steps results in performing a test of the at least one unit under test.

19. The system of claim 17, wherein the test executive program is further executable to:
associate at least one variable with the test executive sequence;
wherein said executing the test executive sequence comprises importing values for the at least one variables from the database.

20. The system of claim 17, wherein the test executive program is further executable to:
include a property loader step in the test executive sequence;
wherein said executing the test executive sequence comprises executing the property loader step;
wherein, in response to said executing the property loader step, the property loader step is operable to import values for the properties associated with the at least one test executive step from the database.

21. The system of claim 20,
wherein the test executive sequence includes a setup group and a main group, each group being capable of including one or more steps;
wherein, during an execution of the test executive sequence, steps in the setup group execute before steps in the main group;
wherein the property loader step is included in the setup group;
wherein each of said plurality of test executive steps is included in the main group.

22. The system of claim 16, wherein the test executive program is further executable to:
configure the test executive sequence with information regarding the values to be loaded from the database;
wherein said configuring the test executive sequence comprises receiving user input specifying that the test executive sequence should import property values from said database accessible from the computer system.

23. The system of claim 22,
wherein said importing values from the database comprises importing the values from database columns;
wherein said configuring the test executive sequence further comprises receiving user input specifying a mapping from the properties to the database columns.

24. The system of claim 17, wherein the at least one of the plurality of test executive steps having one or more associated properties is an instance of a particular step type defining the one or more associated properties.

25. The system of claim 17, wherein the test executive program is further executable to:

prior to said executing the test executive sequence, receive a user command to export property values for the test executive sequence to the database;

export property values for the test executive sequence to the database, in response to said receiving the user command;

wherein said exporting property values for the test executive sequence comprises exporting property values for the one or more properties associated with the at least one test executive step to the database;

wherein said importing values for the properties associated with the at least one test executive step from a database comprises importing the previously exported values.

26. The system of claim 25, wherein said exporting property values to the database comprises automatically creating one or more columns associated with the property values in the database.

27. A memory medium comprising program instructions executable to:

create a test executive sequence comprising a plurality of test executive steps, wherein at least one of the plurality of test executive steps has one or more associated properties; and execute the test executive sequence, wherein said executing the test executive sequence includes importing values for the properties associated with the at least one test executive step from a database.

28. The memory medium of claim 27, wherein said executing the test executive sequence further comprises executing the plurality of test executive steps;

wherein said executing the plurality of test executive steps results in performing a test of a unit under test (UUT).

29. The memory medium of claim 27, wherein the program instructions are further executable to:

associate at least one variable with the test executive sequence;

wherein said executing the test executive sequence comprises importing values for the at least one variables from the database.

30. The memory medium of claim 27, wherein the program instructions are further executable to:

include a property loader step in the test executive sequence;

wherein said executing the test executive sequence comprises executing the property loader step;

wherein, in response to said executing the property loader step, the property loader step is operable to import values for the properties associated with the at least one test executive step from the database.

31. The memory medium of claim 30, wherein the test executive sequence includes a setup group and a main group, each group being capable of including one or more steps;

wherein, during an execution of the test executive sequence, steps in the setup group execute before steps in the main group;

wherein the property loader step is included in the setup group;

wherein each of said plurality of test executive steps is included in the main group.

32. The memory medium of claim 27, wherein the program instructions are further executable to:

configure the test executive sequence with information regarding the values to be loaded from the database;

wherein said configuring the test executive sequence comprises receiving user input specifying a particular database from which to import property values.

33. The memory medium of claim 32, wherein said importing values from the database comprises importing the values from database columns;

wherein said configuring the test executive sequence further comprises receiving user input specifying a mapping from the properties to the database columns.

34. The memory medium of claim 27, wherein the at least one of the plurality of test executive steps having one or more associated properties is an instance of a particular step type defining the one or more associated properties.

35. The memory medium of claim 27, wherein the program instructions are further executable to:

prior to said executing the test executive sequence, receive a user command to export property values for the test executive sequence to the database;

export property values for the test executive sequence to the database, in response to said receiving the user command;

wherein said exporting property values for the test executive sequence comprises exporting property values for the one or more properties associated with the at least one test executive step to the database;

wherein said importing values for the properties associated with the at least one test executive step from a database comprises importing the previously exported values.

36. The memory medium of claim 35, wherein said exporting property values to the database comprises automatically creating one or more columns associated with the property values in the database.

37. A method for dynamically configuring a test executive sequence, the method comprising:

including a plurality of test executive steps in the test executive sequence, wherein at least one of the plurality of test executive steps has one or more associated properties;

including a property loader step in the test executive sequence; and executing the test executive sequence;

wherein said executing the test executive sequence comprises executing the property loader step;

wherein, in response to said executing the property loader step, the property loader step is operable to import values for the properties associated with the at least one test executive step from a database.

\* \* \* \* \*